Figure 1:
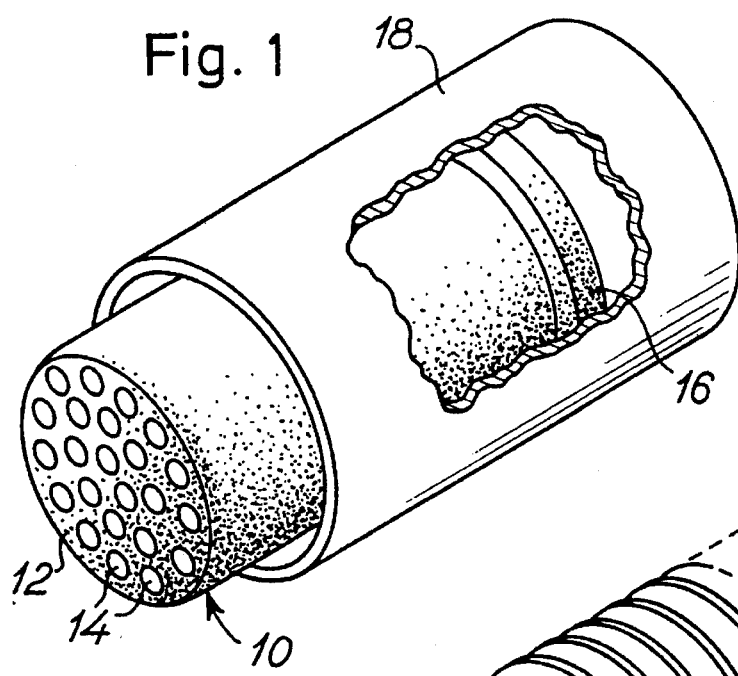

United States Patent [19]

Stobbe

[11] Patent Number: 5,497,620
[45] Date of Patent: Mar. 12, 1996

[54] METHOD OF FILTERING PARTICLES FROM A FLUE GAS, A FLUE GAS FILTER MEANS AND A VEHICLE

[76] Inventor: Per Stobbe, Nørgaardsvej 6B, 2800 Lyngby, Denmark

[21] Appl. No.: 997,652

[22] Filed: Dec. 28, 1992

Related U.S. Application Data

[63] Continuation of Ser. No. 884,480, May 13, 1992, Pat. No. 5,195,319, which is a continuation of Ser. No. 623,429, filed as PCT/DE89/00083, Apr. 10, 1989, abandoned.

[30] Foreign Application Priority Data

Apr. 8, 1988 [DK] Denmark .................................. 1938/88
Aug. 18, 1988 [DK] Denmark .................................. 4650/88

[51] Int. Cl.$^6$ ...................................................... F01N 3/02
[52] U.S. Cl. .............................. 60/303; 60/311; 55/523; 55/DIG. 30; 55/DIG. 5; 264/56
[58] Field of Search .............................. 60/303, 311, 274, 60/299; 55/522, 523, DIG. 30, DIG. 5; 264/56

[56] References Cited

U.S. PATENT DOCUMENTS

| 2,593,943 | 4/1952 | Wainer . |
| 2,709,651 | 5/1955 | Gurnick . |
| 2,792,302 | 5/1957 | Mott . |
| 2,902,363 | 9/1959 | Joyner . |
| 3,223,523 | 12/1965 | Adler . |

(List continued on next page.)

FOREIGN PATENT DOCUMENTS

| 0035053 | 9/1981 | European Pat. Off. . |
| 0043694 | 1/1982 | European Pat. Off. . |
| 0057848 | 8/1982 | European Pat. Off. . |
| 0089756 | 9/1983 | European Pat. Off. . |
| 0090492 | 10/1983 | European Pat. Off. . |
| 0206250 | 12/1986 | European Pat. Off. . |
| 0220505 | 5/1987 | European Pat. Off. . |
| 0244061 | 11/1987 | European Pat. Off. . |
| 0351056 | 1/1990 | European Pat. Off. . |

(List continued on next page.)

OTHER PUBLICATIONS

Ceramic Bulletin vol. 70, No. 7, 1991, p. 1147, edited by Laurel M. Sheppard.
Peter K. Johnson, The International Journal of Power Metallurgy vol. 23, Nov. 4, 1987. "Award–Winning Powder metallurgy Products".
Bruce B. Bykowski, American Society of Mechanical Engineering. "Formulation and Evaluation of Alternate Diesel Particulate Trap Media".
R. M. German, Porous Metals: Materials Engineering Department, Resselaer Polytechnic Institute, Troy, New York 12181. R. M. German.
Automotive Engineering, Jul. 1987, Resin Sealing of P/M parts: a primer.

Primary Examiner—Ira S. Lazarus
Assistant Examiner—L. Heyman
Attorney, Agent, or Firm—Merchant, Gould, Smith, Edell, Welter & Schmidt

[57] ABSTRACT

In filtering particles such as soot from a flue gas a porous filter body of a particulate material bonded together in the body is employed. The material is a metal or metal-like material having a thermal conductivity in excess of 10 W/mK, and the porous filter body has a porosity of 50–90% and a maximum pore size of 10–40 um. The porous filter body also has a thermal conductivity in excess of 10 W/mK. In accordance with the method, the flue gas is conducted through the porous filter body so as to accumulate the particles in the porous filter body. The particles accumulated in the porous filter body are burned off, whereby heat is generated locally. The heat generated locally by the burning-off of the particles is conducted throughout the porous filter body so that the temperature rise generated by the burning-off heat is reduced. Consequently, the porous filter body is not exposed to fatal, thermal stresses. A particular application of the porous filter body of the flue gas filter means is in vehicles comprising combustion engines generating soot, such as in diesel engines.

19 Claims, 3 Drawing Sheets

U.S. PATENT DOCUMENTS

| | | | |
|---|---|---|---|
| 3,313,621 | 4/1967 | Mott . | |
| 3,620,690 | 11/1971 | Bergstrom . | |
| 3,788,486 | 1/1974 | Bergstrom . | |
| 3,940,269 | 2/1976 | Bergstrom . | |
| 4,040,253 | 8/1977 | Dhugues et al. | 60/303 |
| 4,277,374 | 7/1981 | Lula . | |
| 4,329,162 | 5/1982 | Pitcher . | |
| 4,410,427 | 10/1983 | Wydeven . | |
| 4,415,344 | 11/1983 | Frost et al. . | |
| 4,417,908 | 11/1983 | Pitcher, Jr. | 55/523 |
| 4,436,538 | 3/1984 | Tomita et al. | 60/311 |
| 4,535,589 | 8/1985 | Yoshida et al. | 60/303 |
| 4,582,677 | 4/1986 | Sugino et al. . | |
| 4,604,869 | 8/1986 | Yoshida et al. . | |
| 4,662,911 | 5/1987 | Hirayama et al. | 55/282 |
| 4,667,469 | 5/1987 | Abthoff et al. | 60/311 |
| 4,704,863 | 11/1987 | Abthoff et al. | 60/311 |
| 4,732,593 | 3/1988 | Kondo et al. | 55/523 |
| 4,759,918 | 7/1988 | Homeier et al. | 423/213.5 |
| 4,813,231 | 3/1989 | Bykowski | 60/274 |
| 4,857,089 | 8/1989 | Kitagawa et al. | 55/523 |
| 4,945,722 | 7/1990 | Goerlich | 60/295 |
| 4,973,458 | 11/1990 | Newby et al. | 423/244 |
| 4,976,760 | 12/1990 | Helferich et al. | 55/487 |
| 5,009,857 | 4/1991 | Haerle | 422/180 |
| 5,016,437 | 5/1991 | Huether et al. | 60/280 |
| 5,073,178 | 12/1991 | Mimori et al. | 55/523 |

FOREIGN PATENT DOCUMENTS

| | | |
|---|---|---|
| 3004209 | 2/1983 | Germany . |
| 3232729 | 3/1984 | Germany . |
| 57-110311 | 7/1982 | Japan . |
| 107215 | 10/1982 | Japan . |
| 58-143817 | 8/1983 | Japan . |
| 58-174216 | 10/1983 | Japan . |
| 59-99019 | 6/1984 | Japan . |
| 61-423 | 1/1986 | Japan . |
| 61-191575 | 8/1986 | Japan . |
| 61-259763 | 11/1986 | Japan . |
| 100775 | 8/1962 | Norway . |
| 1004352 | 9/1965 | United Kingdom . |
| 2170820 | 8/1986 | United Kingdom . |

METHOD OF FILTERING PARTICLES FROM A FLUE GAS, A FLUE GAS FILTER MEANS AND A VEHICLE

This is a continuation of application Ser. No. 07/884,480, filed May 13, 1992, now U.S. Pat. No. 5,195,319, which is a continuation of Ser. No. 07/623,429, filed as PCT/DK89/00083, Apr. 10, 1989, now abandoned.

The present invention relates to the technical field of filtering particles from flue gas generated by the combustion of fossil fuel, such as coal, fuel oil or diesel oil. A particular application of the present invention is the technical field of filtering particles from exhaust gases from a combustion engine, particularly a diesel engine, which may be a motor in a vehicle, e.g. a truck, a locomotive, an aircraft, a ship or constitute a working machine in a power plant. Alternatively or additionally, the present invention may find application in the technical field of filtering particles from flue gas exhausted from power plants and refuse disposal plants.

It is well-known within the art to filter particles or soot from the exhaust or flue gases generated by the combustion of combustible material, such as coal or oil, particularly fuel oil or diesel oil.

Exhaust or flue gas filters for diesel engines aim at filtering the soot from the exhaust or flue gas of diesel engines. The emission of soot from diesel engines is not desirable, as the surface of the soot particles contains small amounts of adsorbed substances, which soot particles and which substances are considered to cause damage.

Some filters for filtering soot from exhaust and flue gas generated by diesel engines are made of a monolith of porous ceramic material, which consists of ducts with thin walls. The ducts are parallel to one another and are each positioned along its whole length in the flow direction of the exhaust or flue gas. The ducts are alternately closed at the upstream or the downstream end and are frequently alternately opened or closed in a checkerboard pattern. Thus, each duct has an open and a closed end. In an alternative embodiment the filter may be wound in the shape of a spiral so as to form a gas-permeable packet, like a corrugated piece of cardboard. Thereby, the covering of the individual ducts is no longer only constructed like a checkerboard, but also like a spiral.

When emissions from a diesel engine are conducted through the above type of filter, exhaust or flue gas enters through the ducts which are open on the inlet side. The exhaust or flue gas is then forced to flow laterally through the porous duct walls into the adjacent ducts, which are open on the outlet side. In this case, the soot particles will accumulate in the ducts that are open upstream, as they cannot pass through the duct walls. The accumulated soot will burn off when a certain temperature is reached, and when a sufficient oxygen concentration is present in the exhaust or flue gas, and the filter will then be regenerated. Between two such processes there is a substantial rise in exhaust or flue gas counterpressure, and this means an increased loading of the filter. In some instances, the burning off of soot becomes extremely intense. Thus, if the filter has reached a high temperature as the engine has been working, and as a high exhaust or flue gas flow with low oxygen content has been conducted through the filter, and if the exhaust or flue gas flow is then reduced to a low flow with high oxygen content, the soot is burned off, by which burning-off, due to the low flow, the energy generated by the burning-off is accumulated in the filter resulting in an extreme increase in the temperature of the filter, which may result in that the melting point of the ceramic material is exceeded and the filter is destroyed.

The above problem is described in U.S. Pat. No. 4,667,469, to which reference is made, and which is herewith incorporated in the present specification by reference. According to the teachings of the above U.S. patent, a particular structure of the ceramic gas filter is claimed to solve the above problem. However, it has turned out that the gas filters constructed in accordance with the teachings of the above U.S. patent are susceptible to destruction through the burning-off of soot.

In U.S. Pat. Nos. 4,436,538 and 4,604,869, to which reference is made, and which are herewith incorporated in the present specification by reference, alternative ceramic gas filter structures are disclosed. Common to the known gas filters, which are based on ceramic materials, is the fact that the gas filters are highly susceptible to destruction by burning-off of the soot accumulated in the gas filters. Furthermore, known gas filters based on ceramic materials are of extremely low mechanical strength. Thus, it has turned out that a Corning glass filter disc constituting a component of the gas filter described in U.S. Pat. No. 4,667,469, is very brittle and has extremely low tensile strength.

An object of the present invention is to provide a method of filtering particles from flue gas, which solves the above burning-off problems, and further to provide a flue gas filter means, by means of which flue gas filter means the above burning-off problems are solved.

An advantage of the present invention as compared to the known ceramic gas filter structures, which at present are extremely expensive, is the fact that the flue or gas filter means according to the present invention may be manufactured from fairly cheap materials, and consequently sold at a low price, by the employment of extremely simple manufacturing processes well-known, per se, within the art.

A further advantage of the present invention as compared to the known ceramic gas filter structures, which have extremely low mechanical strength, is the fact that the flue gas filter means according to the present invention has a high mechanical strength, which renders it possible to provide filter means assemblies of a larger size than filter assemblies constructed from known ceramic filter structures. Thus, known ceramic structures or ceramic filter assemblies are difficult to manufacture in a size larger than 2–5 liters, as a larger structure becomes too brittle and may be destroyed by exposure to vibrations, such as vibrations generated in an automobile. Contrary to these known filter assemblies, the gas filter means according to the present invention may be implemented in assemblies of a size of at least 20–30 liters. Thus, large assembly units may be provided in accordance with the present invention.

A still further advantage of the present invention as compared to the known ceramic gas filter structures, which have extremely low thermal conductivity and extremely low thermal expansion coefficients, is the fact that contrary to the known ceramic gas filter structures, which demand a sofisticated canning, the flue gas filter means according to the present invention is easily canned in e.g. a low alloy stainless steel can or enclosure means or in another can or enclosure means of another appropriate metal material.

The above and other objects, features and advantages are obtained by a method according to the present invention of filtering particles from flue gas by means of a porous filter body of a particulate material bonded together in the body, the material being a metal or a metal-like material having a thermal conductivity in excess of 10 W/mK, such as 15–385 W/mK, the porous filter body having a porosity of 30–90%, preferably 40–75%, such as 40–50%, and a maximum pore size of 10–100 μm, preferably 25–75 μm, such as 25–50 μm, and said porous filter body having a thermal conductivity in excess of 5 W/mK, preferably 5–100 W/mK, such as 5–40 W/mK, the method comprising the steps of conducting the flue gas through the porous filter body, thereby accumulating the particles in the porous filter body, and burning off the particles accumulated in the porous filter body by which burning-off heat is generated locally and by which burning-off the heat generated locally is conducted throughout the porous filter body so as to reduce the local temperature rise generated by the heat.

The basis of the technical solution to the above stated problem is the realization that the accumulation of energy by the burning-off of particles accumulated in the porous filter body may be eliminated or reduced by producing the porous filter body of a metal or metal-like material and having a high thermal conductivity so as to conduct or spread the heat generated locally by the burning-off of the particles accumulated in the porous filter body throughout the porous filter body in order to reduce the local temperature rise generated in the porous filter body by the burning-off and consequently reduce the thermal stresses to which the porous filter body is locally exposed to such an extent that any fatal destruction of the porous filter body is eliminated.

A particular aspect of the present invention relates to a regeneration technique. Thus, in accordance with a preferred embodiment of the method according to the present invention, the burning-off of the particles is generated by heating the porous filter body to such a temperature that the particles are burned off.

Thus, the porous filter body may conduct heat from an external heat source or may conduct electric current, which provides a heating of the filter body, in order to bring about the heating of the filter body. The temperature at which carbon is oxidized in the atmosphere to carbon monoxide is approximately 500° C., while the temperature at which carbon particles contained in exhaust or flue gas from e.g. a diesel engine are oxidized is approximately 500°–550° C. Consequently, the porous filter body according to the present invention is preferably of a material which can stand heating to a temperature of at least 550° C., or more, such as 600° C., unless the oxidizing temperature is reduced by the employment of a carbon oxidation catalyst, such as catalysts, e.g. vanadium pentoxide, $Fe_2O_3$, other ferrous oxides or copper oxides, by which the carbon oxidation temperature is reduced to approximately 350°–450° C. Consequently, provided a carbon oxidizing catalyst is employed, the temperature to which the filter body is heated in accordance with the regeneration aspect of the method according to the present invention is of the order of 300°–600° C., preferably 300°–450° C.

The above regeneration of the filter means according to the present invention by heating the porous filter body to such a temperature that any particles accumulated in the porous filter body are burned off may preferably be carried out periodically, and the above step of conducting the flue gas through the filter means is preferably also carried out periodically, so that at least two porous filter bodies are employed, one of which is used for filtering particles from the flue gas by conducting the flue gas therethrough, while the other porous filter body is regenerated by heating the porous filter body to a temperature, which brings about the burning-off of any particles accumulated therein. After a period of time constituting an operational cycle, the first porous filter body is regenerated, and the other porous filter body is used for filtering particles from the flue gas by conducting the flue gas therethrough.

However, it is to be emphasized that the periodic regeneration of the porous filter bodies according to the method of the present invention is not limited to a set of porous filter bodies comprising at least two porous filter bodies, as a single porous filter body may periodically be heated to a temperature at which any particles accumulated therein are burned off, while the flue gas is still conducted through the porous filter body or while the porous filter body is not in operation (the particles generating engine or plant, the exhaust or flue gas of which is conducted to the porous filter body is not in operation). Still further, during the regeneration of the porous filter body according to the method of the present invention, oxygen may be introduced into the porous filter body for accelerating the burning-off of the particles accumulated therein, or a chemical constituent promoting or cathalyzing the burning-off of the particles may be used, or preheated air may be introduced into the porous filter body for producing the burning-off of the particles accumulated in the porous filter body, which in accordance with this alternative embodiment of the method of the present invention and in accordance with the teachings of the present invention serves the purpose of conducting the heat generated locally by the burning-off of the particles throughout the porous filter body so as to eliminate the risk of damaging the porous filter body by any local excessive exposure to extremely high temperatures.

According to a still further embodiment of the method of the present invention, the porous filter body is regenerated or rinsed by conducting a rinsing air flow therethrough in the direction opposite to the direction in which the flue gas is conducted therethrough so as to blow out in a back or return flow the majority of the particles accumulated in the porous filter body.

The present invention further relates to a flue gas filter means for filtering particles from flue gas and comprising a porous filter body of a particulate metal or metal-like material bonded together in the porous filter body, the porous filter body having a porosity of 30–90%, preferably 40–75%, such as 40–50%, and a maximum pore size of 10–100 μm, preferably 25–75 μm, such as 25–50 μm, and said porous filter body having a thermal conductivity in excess of 5 W/mK, preferably 5–100 W/mK, such as 5–40 W/mK, for conducting heat generated locally by burning off the particles accumulated in the porous filter body throughout the porous filter body so as to reduce the local temperature rise generated by the heat.

It is known within the technical field of plastics materials to employ rigid metal filters for filtering a mass of plastics material. Within this technical field, a plurality of rigid metal filters have been developed and serve the purpose of providing a filter capable of withstanding a high pressure gradient by an inherent high mechanical strength of the rigid metal filter. Thus, in U.S. Pat. Nos. 3,620,690, 3,788,486, and 3,940,269, to which reference is made and which are herewith incorporated in the present specification by reference, a sintered austenitic-ferritic chromium-nickel steel alloy, a rigid filter for filtering molten thermoplastic resin and further a process of blending powdered austenitic chromium-nickel stainless steel, respectively, are disclosed. According to the techniques described in these U.S. patents, low density products may be provided, which are stated to have particular utility as filter elements. However, it is to be realized that the filters described in these U.S. patents pay no or little attention to the thermal conductivity properties of the metal filter elements, and furthermore pay no attention to the above described burning-off problem.

The porous filter body of the flue gas filter means according to the present invention may advantageously be provided in accordance with techniques known in the art per se, such as the techniques described in the above U.S. Pat. Nos. 3,620,690, 3,940,269, and 3,788,486, and further in accordance with the techniques described in numerous references, such as the following U.S. Pat. Nos. 2,792,302, 2,709,651, 2,902,363, 2,593,943. 3,223,523, 3,836,302, and 3,919,384, to which reference is made, and which U.S. patents are further incorporated in the present specification by reference.

Thus, porous filter bodies may according to these techniques be made from powder of metal materials or metal-like materials by a variety of processes including the well-known cold compact process with or without a transient pore forming agent, such as fibres or spheres of a plastics material, such as organic polymer materials, e.g. silicone compositions, polypropylene or polystyrene, and subsequent sintering, and a so-called no-pressure sintering method. Alternatively, the porous filter bodies may be made by a casting process, e.g. an injection moulding process such as an injection process in which a mould, such as a plastics material or wax mould is employed. After filling the mould with the particulate metal or metal-like material, the plastics material or wax mould is melted away or burnt away. The material may be poured into the mould in a liquid phase comprising a volatile liquid and/or a liquid or solid binder. Further alternatively, the porous filter bodies may be made in an extrusion process, e.g. in accordance with the techniques described in the above U.S. Pat. Nos. 3,836,302 and 3,919,384. It is also known to mix metal powder with a binder optionally mildly solidifying the mixture and/or linearly isostatically pressing the mixture, and to sinter the mixture, by which sintering process the binder is removed or solidified so as to bond the metal powder together. In the above U.S. patents, numerous materials and binders are disclosed. These methods find application in the manufacture of particulate porous particles, and the selection of optimum method parameters etc. for any application depends upon the size of the articles to be produced, its contour, its dimensions, its porosity and/or permeability, its mechanical strength, and further its thermal conductivity.

In a report, "Technical and Economic Evaluation of a Cold Isostatic Pressing Technique and Examination of the Pre-green specimen process" issued by Technological Institute/Industrial Metallurgy, a division of Teknologisk Institut, Tåstrup, Denmark, dated February, 1987, aspects of a method for the production of specimens or products on the basis of powder materials is disclosed. The report mainly aims at specimens of high compactness, however, as will evident from an example to be discussed below, the technique described in this report may in a highly simple manner by the reduction of the static pressure to a very low pressure value be adapted to the production of a high-porous filter body of the flue gas filter means according to the present invention. As far as this advantageous method is concerned, reference is made to the report and to the example to be discussed below.

Dependent on the characteristics of the porous filter body of the flue gas filter means according to the present invention, as to thermal conductivity, mechanical strength, capability of exposure to elevated or high temperatures, determined by the melting point or points of the metal or metals of the filter body, the size, dimensions and structure of the filter body, etc., the material or materials of the filter body is or are determined. However, it is believed that the metal material of the porous filter body may advantageously be selected from the group consisting of aluminum, copper, iron, compositions, alloys and combinations of alloys thereof, such as brass, bronze, duraluminum, stainless steel, etc. Furthermore, other metals such as chromium, molybdenum, nickel, silver and titanium may advantageously be employed in said filter body or in combinations or alloys of said filter body. Furthermore, other metals such as manganese, vanadium, yttrium, and rare earth metals such as cerium, lanthanum, neodymium, and noble metals such as platinum, palladium and rhodium may be employed. Furthermore, it is believed that the metal-like material of the porous filter body may advantageously be selected form the group consisting of: SiC, $B_4C$, $Na_xWO_3$ ($0<x<1$, such as $0.3<x<0.9$), $M_2B$, MB, $MB_2$, $M_2B_5$, $M_2C$, MC, $M_2N$, MN, $M_3Si$, $M_3Si_2$, $M_5Si_3$ and $MSi_2$ (M being Mo or W).

In the present context, the term "metal-like material" comprises any material which is not a metal, but which, however, exhibits metallic characteristics or properties, particularly a high thermal conductivity and preferably further a high electrical conductivity. Such materials offer and preferably exhibit high corrosion resistance. Thus, a thermal conductivity in excess of 10 W/mK is in the present context a high thermal conductivity. At present, silicon carbide SiC is believed to be the most important basic metal-like material, as, apart from a high thermal conductivity of 90–100 W/mK, it has a high melting point of approximately 2400° C. and furthermore resists oxidation at elevated temperatures.

It is believed that the metals aluminum, copper and iron or steel are the most important basic metal components, as iron or steel is a fairly cheap material, which is strong and has a high melting point of approximately 1600° C. and a thermal conductivity of 50 $W/m^K$, as aluminum has a high thermal conductivity of the order of 200 W/mK and a very low density, and as copper has an extremely high thermal conductivity of approx. 385 W/mK, a fairly high melting point of approx. 1100° C., and is further a semi-noble or semi-precious metal. The selection of any specific metal, any metal-like material, any specific alloy or combination of metals or alloys or any combination of metals, alloys and metal-like materials for the material of the porous filter body of the flue gas filter means according to the invention will further be determined by considering the ability of the metal alloy, combination of alloy and metal or metal-like material to catalytically oxidize carbon, carbon monoxide and/or hydrocarbons and the compatibility of the material with any carbon oxidation catalyst. Thus, copper alloys or combinations of alloys, e.g. brass and bronze alloys and furthermore some metal oxides, e.g. ferrous oxides and manganese oxides, have been stated to have a carbon oxidation catalyst effect, and brass and bronze or generally copper alloys are at present considered relevant metals of the porous filter body. Further considerations as to additional materials, such as binders, and resistance to the environment to which the flue gas filter means is exposed, may be important as to the specific selection of metal material. Furthermore or additionally, the material of the filter body may comprise vanadium or vanadium oxide compositions, such as vanadium pentoxide, which are known to have advantageous carbon oxidation catalytic characteristics.

In German patent No. 34 40 202, and in published German patent applications Nos. 32 32 729 and 34 38 217, interesting carbon oxidation catalysts are disclosed, viz, zirconium oxide chloride ($ZrOCl_2$), lithium oxide ($Li_2O$) and vanadium pentoxide ($V_2O_5$). The catalyst may thus constitute a component of the composition or alloy of the filter body or constitute a coating of said body. Alternatively or additionally, the catalyst may constitute a salt or an oxide of a component or constitutent of the metal of the filter body, which salt or oxide (e.g. copper or aluminum salts or oxides of copper or aluminum, respectively), may be provided by chemically treating the filter body by means of an acid or electrolytic solution. Thus, it is believed that the porous filter concept of the present invention renders it possible to select carbon oxidizing catalysts different from the carbon oxidation catalysts used hitherto in connection with flue gas filters constructed from ceramic materials, as the catalysts which are compatible with a metal body or a body of a metal-like material are different from the catalysts which are compatible with or may be used in connection with known ceramic filters.

The filter means according to the present invention may be implemented in numerous sizes and structures, such as the structures described in the references mentioned above. In the presently preferred embodiment of the filter means according to the present invention, the porous filter body has a flue gas inlet side surface and an opposite gas outlet side surface, a first plurality of blind filtration cavities extending perpendicularly into said body from said inlet side surface and a second plurality of blind filtration cavities extending perpendicularly into said body from said outlet side surface, said blind filtration cavities of said first and said second pluralities being arranged spaced apart and mutually juxtaposed.

Alternatively or furthermore, the porous filter body of the filter means according to the present invention may have partition walls defining a honeycomb structure or the porous filter body may be of a tubular structure. In accordance with a further alternative or additional embodiment of the flue gas filter means according to the present invention, the porous filter body is constituted by a basically circular disc of a thickness, which is far smaller, several factors power of ten, than the diameter of the disc. The above described embodiments of the filter means are highly advantageous embodiments for the filtering of particles or soot from the exhaust gas generated by diesel engines, such as diesel engines of vehicles.

The particular to be filtered from the flue gas generated by a diesel engine mainly comprise carbon, however, further, as indicated above, include additives originating from additives to the diesel oil, additives of lubricants and materials or particles originating from engine wear. The origin of the particles is not completely revealed, however, a spectroscopic analysis of particles originating from a diesel engine discloses that the particles contain among others: Li, B, C, F, Na, Mg, Al, Si, P, S, Cl, K, Ca, Ti, Cr, Mn, Fe, Co, Ni, Cu, and Zn. The particles generated by a diesel engine are extremely small, thus, more than 50% of the particles are less than 0.5 µm and has a density of 0.05–0.1 g/cm$^3$. A further analysis of the particles discloses that the soluble organic content of the particles if 5–20% by volume, in some instances even up to 90%, the content of hydrogen is 0–2%, the content of carbon is 70–90%, the content of ashes is 0–2%. The shape of the particles is irregular and defines an extremely large surface area, thus, the particles are highly porous and have a soft surface.

From the above, it will be understood that the particles to be filtered from the flue gas generated by a diesel engine are not only carbon particles, which may be oxidized into carbon monoxide and further by means of e.g. a platinum catalytic means, as is well-known within the art, be oxidized into carbon dioxide. However, some of the constituents of the particles remain in the filter body and result in a clogging of the filter body. Therefore, it is believed that a filter means according to the present invention has a limited lifetime of approx. 3000–4000 hours corresponding to 100.000–150.000 km travelled by a vehicle with a diesel engine.

As indicated above, the flue gas filter means according to the present invention is believed to find application in the field of filtering particles from flue gas generated in power plants, refuse disposal plants, etc., by the combustion of combustible materials, such as fossil fuel, e.g. coal, fuel oil or diesel oil, or refuse or waste. At present, flue gas generated by power plants is filtered by means of electrostatic filters, bag filters or tex-filters comprising membranes made of plastics materials, such as fibre glass resin, teflon, dralon, etc., which, however, cannot stand exposure to temperatures in excess of approx. 200° C., and so-called multi-cyclone filters. Contrary to these known filters, the filter means according to the present invention is believed to provide an efficient means for filtering particles from flue gas generated in power plants or refuse disposal plants. In this application, the filter means is preferably implemented in accordance with an embodiment in which the porous filter body is of a tubular structure, through the peripheral wall of which the flue gas is conducted. Preferably, a plurality of tubular structure filter bodies are employed in a filter assembly of a flue gas filter to be used in a plant of the above type.

Dependent on the specific particulate metal or metal-like material of the porous filter body, the metal or metal-like material may, as described above, be bonded together directly, e.g. by the application of a pressure or heat, e.g. generated by means of an electric current, or simply by heating the material, or alternatively or additionally be bonded together by means of a binder. In the references referred to above and incorporated in the present specification by reference, a plurality of binders are mentioned, and, thus, the binder to be used in connection with the particulate metal material bonded together in the porous filter body of the flue gas filter means according to the present invention is preferably a binder which is activated by a high temperature treatment, such as exposure to a temperature of 400°–1500° C. (metal) or 1000°–2000° C. (metal-like), such as 1100°–1400° C. (metal) or 1400°–1900° C. (metal-like), or is heat fugitive binder such as a heat activated glue. Examples of such binders are elastomeric, thermoplastic or synthetic polymeric materials or resins basis binders well-known in the art per se. Alternatively, the binder may be a metal such as molybdenum, tin, a metal produced by reduction of a metal salt, a metal salt or a metal oxide, which is provided e.g. by a chemical treatment of the surface of the particulate metal material, as the material is bonded together in the porous filter body. Further alternatively or additionally, the binder may be a silicate, such as clay or hydrated aluminium silicate ($Al_2O_3.2SiO_2.2H_2O$) or another metal silicate composition, e.g. potassium or sodium silicate, which is a binder well-known in the art per se, e.g. described and discussed in the above article published by Technological Institute/Industrial Metallurgy, and further in the above U.S. Pat. No. 4,604,869. Further alternatively, a silicic acid ester is believed to be an advantageous binder, in particular in connection with the metal-like material SiC.

As indicated above, the particulate metal or metal-like material may in accordance with the techniques described in the above references, be bonded together in a sintering process, i.e. by heating the material to a high temperature, such as a temperature of 1000°–1500° C., such as 1200°–1300° C. In the high temperature metal sintering process, the sintering is preferably carried out in a reducing atmosphere such as a hydrogen atmosphere or in vacuum in order to substantially eliminate the generation of oxides of the material in question at the surfaces of the particulate metal or metal-like material to be sintered. In the high temperature sintering process of metal-like materials, the sintering is preferably carried out in an atmosphere of $N_2$ or an inert atmosphere, such as He or Ar, or in the atmosphere. Furthermore or additionally, the particulate metal or metal-like material may be compacted prior to the sintering process by applying pressure to the material in a so-called isostatic pressing in which process heat may further be applied to the material.

Figure 2:
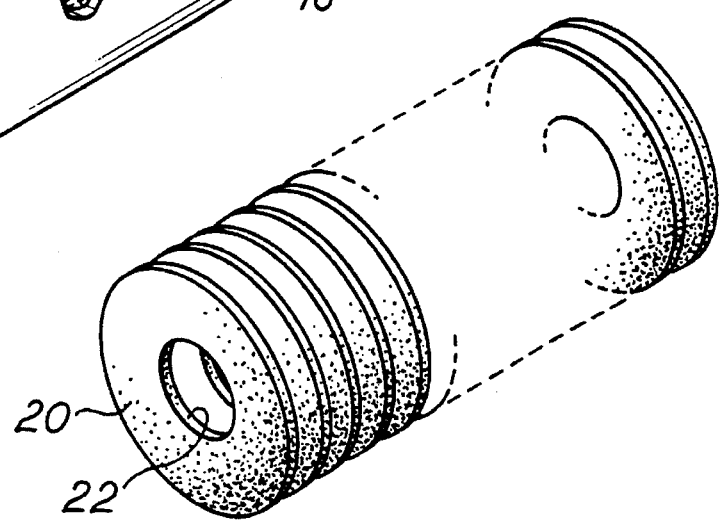
Figure 3:
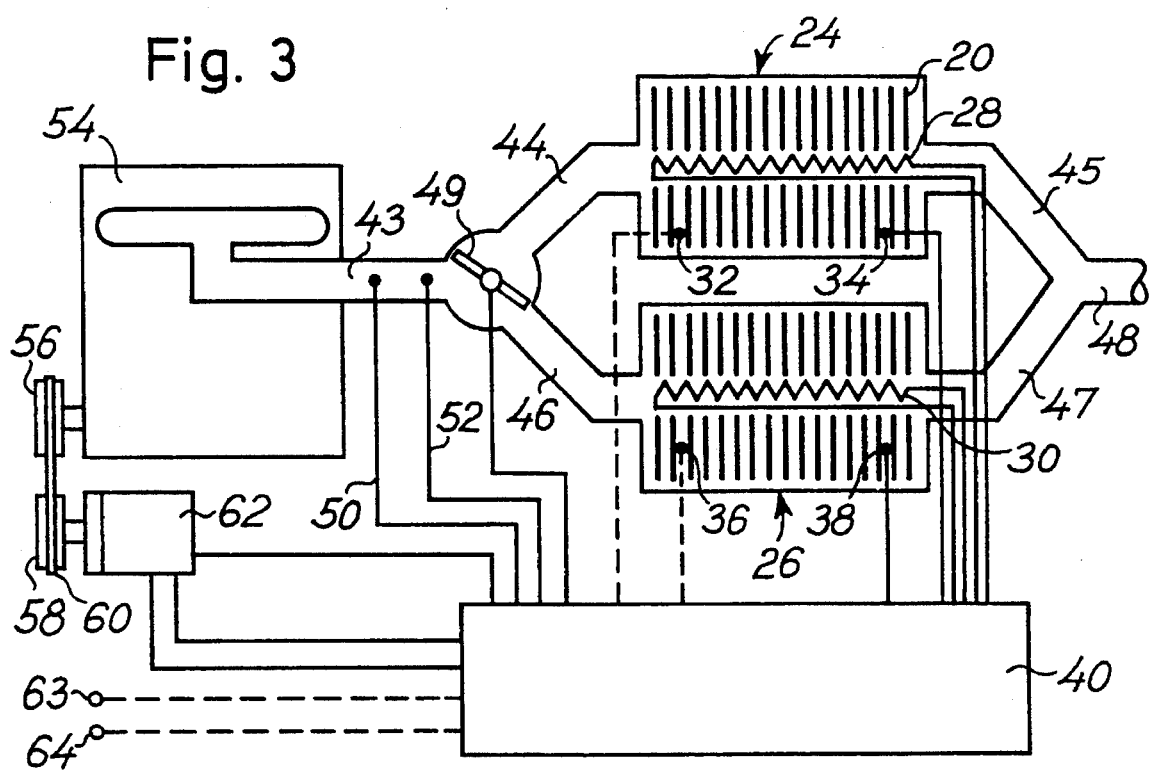
Figure 4:
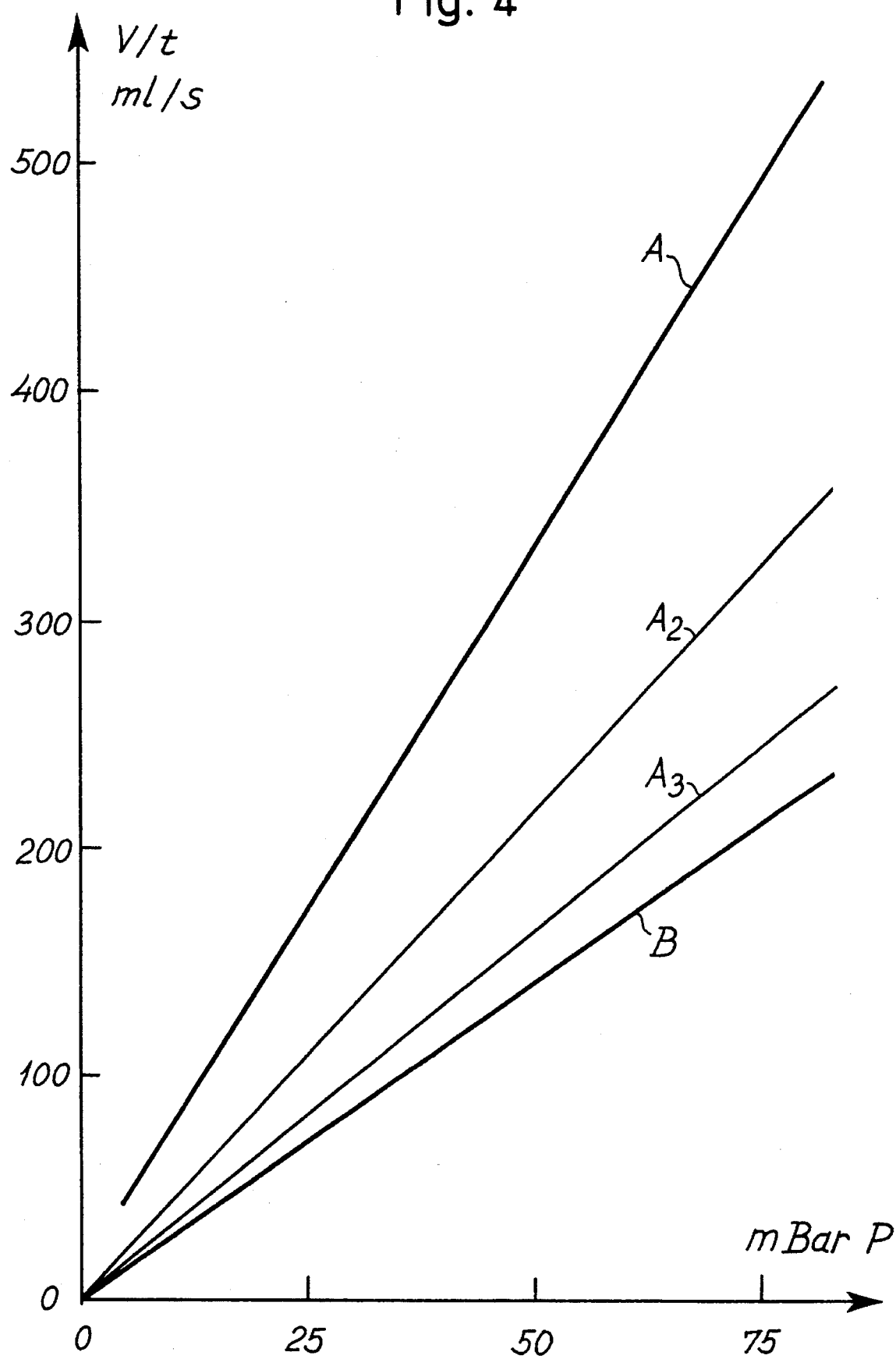
Figure 5:
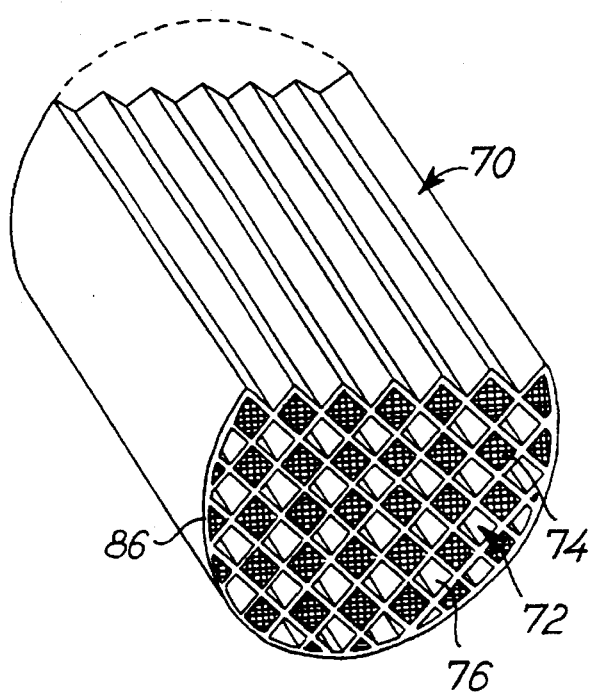
Figure 7:
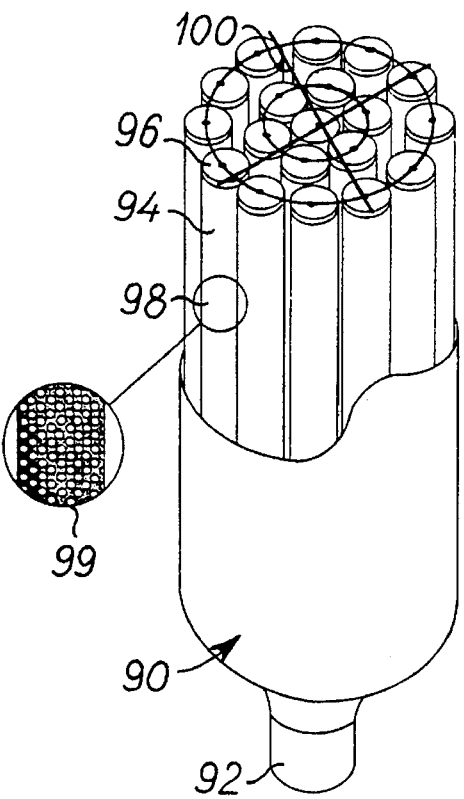
Figure 6:
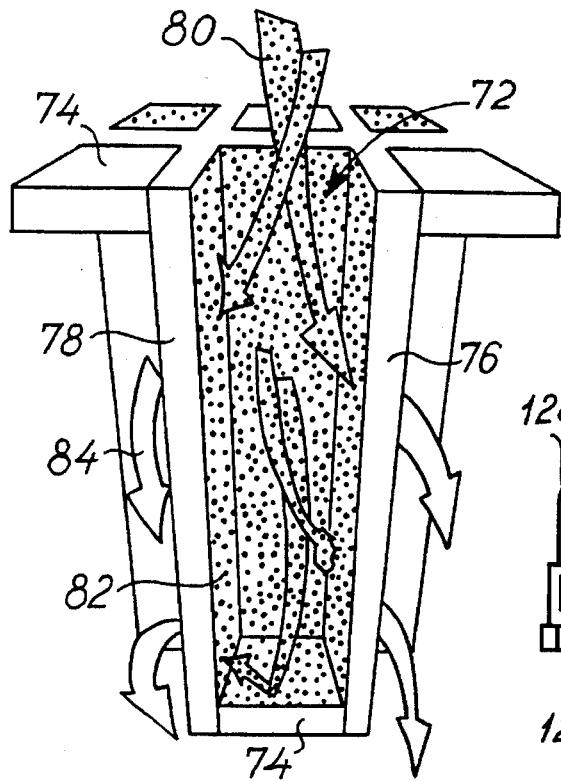
Figure 8:
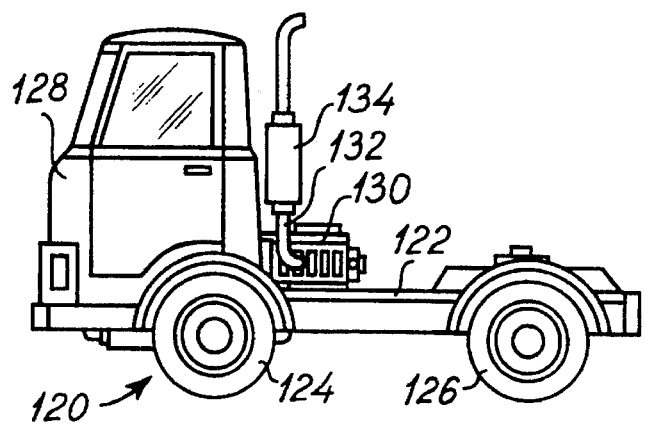

The invention will now be further described with reference to the drawings, in which FIG. 1 is a perspective and partly sectional view of an embodiment of a flue gas filter means according to the present invention comprising a first embodiment of a porous filter body housed in an encasing, FIG. 2 is a perspective and schematic view of a second embodiment of a porous filter body, FIG. 3 is an overall schematic illustration of a set of flue gas filter means connected to an exhaust or flue gas outlet of a diesel engine and illustrating the operational cycle and regeneration cycle concept of the present invention, FIG. 4 is a graph illustrating the result of a comparison test of a porous filter body according to the present invention, and a conventional ceramic filter body, FIG. 5 is a perspective and partly sectional view of a third embodiment of a porous filter body according to the present invention, FIG. 6 is a perspective and schematic view of a segment of the porous filter body shown in FIG. 5, FIG. 7 is a perspective and partly sectional view of an alternative embodiment of a flue gas filter means according to the present invention comprising a fourth embodiment of porous filter bodies, and FIG. 8 is a schematic view of a tractor comprising a flue gas filter means according to the present invention.

In FIG. 1, a porous filter body 10 is shown, which comprises a particulate metal or metal-like material and has a preferred porosity of approximately at least 70%, and a maximum pore size of approximately 35 μm. The porous filter body 10 is made form a metal such as aluminum, copper, iron or steel, alloys, compositions or combinations of alloys thereof or alternatively from e.g. SiC or $B_4C$. The body 10 preferably has a thermal conductivity in excess of 10 $Wm^2K$, such as a thermal conductivity of no less than 15 $Wm^2K$, preferably of the order of 50–385 $Wm^2K$. The body 10 is basically of a circular, cyclindrical shape and has a left-hand circular inlet side surface 12, from which a plurality of blind filtration bores extend perpendicularly into the body 10. From the opposite side surface or end of the body 10, which side surface constitutes an outlet end and is not shown in FIG. 1, a further plurality of blind filtration cavities extend perpendicularly into the body 10. At the above mentioned outlet end of the body 10, the body 10 is provided with a peripheral thickening 16, which fits inside an outer encasing 18. The thickening 16 serves the purpose of guiding the body 10 within the encasing 18 so as to render it possible to mount and demount the body 10 relative to the encasing 18, even if the body 10 has been mildly deformed due to exposure to thermal stresses or high temperatures.

In FIG. 2, a second embodiment of a filter body or rather a filter body assembly embodiment is shown comprising a plurality of circular porous metal filter discs 20 made from particulate metal or metal-like material, which discs 20 are provided with central apertures 22.

In FIG. 3, two sets of circular, porous filter discs 20 are arranged in a first flue gas filter assembly 24 and a second flue gas filter assembly 26. In the first flue gas assembly 24, two temperature detectors 32 and 34 are arranged, and in the second flue gas filter assembly 26 two temperature detectors 36 and 38 are arranged. The temperature detectors 32, 34, 36, and 38 are connected to an electric control block 40, which is further connected to an electric heater or heating element 28 arranged within the assembly 24 and which extend through the central circular apertures 22 of the discs 20 of the assembly 24. Similarly, an electric heater or heating element 30 is arranged in the flue gas filter 26. As will be evident from the description and further from FIG. 3, the assemblies 24 and 26 are identical. The assemblies 24 and 26 are arranged in exhaust or flue gas conducts connected to an exhaust channel 43 of a diesel engine 54. The engine 54 may constitute a motor of a bus, trolley, truck, locomotive or any other vehicle. The exhaust or flue gas generated by the engine 54 and expelled through the exhaust channel 43 is conducted by means of a conducting element 49 to a first inlet channel 44, which is connected to an inlet of the assembly 24 or alternatively, as shown in FIG. 3, is conducted to a second inlet channel 46, which is connected to an inlet of the assembly 26. A first outlet channel 45 is connected to an outlet of the assembly 24, and a second outlet channel 47 is connected to an outlet of the assembly 26, which outlet channels 45 and 47 are connected to a joint outlet channel 48. In the exhaust channel 43 of the engine 54, a temperature sensor and a pressure sensor are arranged, which are connected to the control block 40 through wires 50 and 52, respectively. On an output shaft of the engine 54, a pulley 56 is arranged, which pulley is connected to a pulley of a shaft of an electrical generator 62 through a belt 60. The electrical generator 62 is connected to the control block 40. The block 40 may further or alternatively be connected to a mains supply through mains supply terminals 63 and 64 for receiving electrical power from a mains supply, such as a 380 V, 50 Hz mains supply.

In operation of the exhaust or flue gas rinsing or filtering system shown in FIG. 3, the filtering of the exhaust or flue gas is periodically shifted from one of the assemblies 24 and 26 to the other. The shift may be time-controlled so that after a specific period of time the control block 40 brings about a shift from filtering by means of the assembly 24 to a filtering by means of the assembly 26, or vice versa. Alternatively, the time of shift from one assembly to another may be controlled by the control block 40 determined by the pressure detector connected to the control block 40 through the wire 52 so that any excessive increase in the pressure of the exhaust channel 43 results in a shift from the filter assembly presently used for filtering the exhaust or flue gas to the other filter assembly. Alternative operational routines will be obvious to a person having ordinary skill in the art.

While the filter assembly 26 is used for filtering particles and additives from the exhaust or flue gas generated by the engine 54 by means of the discs 20, the first filter assembly 24 is regenerated or rinsed at some time during the operational time of the filter assembly 26 by burning off the particles, which mainly comprise carbon, and which are accumulated on the discs 20 of the filter assembly. The burning-off of the carbon particles is effected by the supply of heat to the filter assembly 24 or more precisely, in the embodiment shown in FIG. 3 by the supply of heat to the discs 20 of the filter assembly 24, which heat is generated by the electrical heater 28, which receives electric power from the generator 62 or alternatively from the mains supply through the terminals 63 and 64. The electric generator 62 in any event serves the purpose of supplying electric power to a battery package of the control block 40, which battery package supplies electric power to the electronic and electrical control means of the block 40. Optionally, the control block 40 may control the electric generator 62 and switch the electric generator 62 between a first and a second operational mode in which first mode the generator 62 supplies power to the above-mentioned battery package exclusively, and which electric generator in a second operational mode supplies high power to one of the electrical heaters 28 and 30 for regenerating the filter assemblies 24 or 26, respectively.

By the supply of heat generated by e.g. the electrical heater 28 to the porous discs 20 of the assembly 24, the heat is conducted by the discs 20 to the particles accumulated by the discs, which particles at a specific temperature burn off. By the burning-off of the carbon content of the particles and any other combustible content of the particles such as certain nitrogen and carbon hydroxy compositions, further heat is generated, which further or additional heat is conducted throughout the discs 20 and therefrom to the encasing of the assembly 24 and further to the environment. The sudden increase in temperature caused by the burning-off of the combustible particles is detected by the temperature sensors of the assemblies, such as the temperature detectors 32 and 34 of the assembly 24. By the detection of the temperature increase, the control block 40 switches off the heating element, the heating element 28 of the assembly 24 or alternatively, the heating element 30 of the assembly 26, whichever heating element is used for regenerating the filter assembly in question.

It is to be realised that the above described regeneration process, which has been described with reference to FIG. 3, may be carried out employing any embodiment of the flue gas filter means according to the present invention and any embodiment of the porous filter body characteristic of the present invention, such as the first embodiment shown in FIG. 1 and alternative embodiments to be described below with reference to FIGS. 5–7.

EXAMPLE 1

Porous metal filter bodies or discs according to the present invention were produced at the Technological Institute/Industrial Metallurgy, a division of Teknologisk Institut, Tåstrup, Denmark, by a method developed by the Technological Institute/Industrial Metallurgy described in the above report issued by the Institute, according to which method, a metal powder or particulate metal material was mixed with a binder (waterglass or sodium silicate), whereupon the mixture of the metal powder and the binder was pressed into the desired shape. The assemblies produced by the pressing process were hardened by supplying carbon dioxide to the assembly and further by heating and sintering the assembly. Atomized ferrous or iron powder type Atomet 25 and 10% waterglass (sodium silicate) with a modulus ($SiO:Na_2O$) of 2.5 as used. The filter bodies or discs had a diameter of 50 mm, and a thickness varying between 1 mm and 9.5 mm.

The filters were produced by pressing the metal powder/binder mixture in a cylinder at a pressure of 1 t–50 kp/cm$^2$, 10 t–500 kp/cm$^2$ and 20 t–1000 kp/cm$^2$. After the pressing of the filter bodies, the bodies were gassed with $CO_2$, by which gassing the waterglass was hardened so as to bind the metal powder together. The filter bodies were stored at a temperature of 20° C. for a minimum period of time of 72 hours, were subjected to temperature treatment at a temperature of 150° C. for 3 hours and were sintered at a temperature of 1150° C. for 20 minutes.

The filter bodies thus produced were tested, and its was concluded that a majority of the filter bodies fulfilled the desired requirements as to flue gas filter capability, porosity and thermal characteristics.

In FIG. 4, the result of a comparison test, in which a metal disc of a thickness of 2 mm produced as described above was compared to a Cordierite filter disc of a thickness of 0.5 mm. Along the abscissa axis, the counterpressure generated across the filter means is indicated, and along the ordinate axis the flow rate of flue or exhaust gas is indicated. A first curve A indicates the correspondence between counterpressure and flue or exhaust gas flow rate of a new 2 mm porous, ferrous base filter disc according to the present invention. A second and a third curve, $A_2$ and $A_3$ respectively, indicate the correspondence between counterpressure and flow rate of the same metal disc after an intense filtering operation lasting 10 minutes and 20 minutes, respectively. The curve $A_3$ was recorded while the 2 mm metal disc had a particle layer of a thickness of 1 mm collected on the outer side surface of the metal disc. Thus, the metal disc was extremely clogged by particles. A fourth curve B indicates the correspondence between counterpressure and flue or exhaust gas flow rate of a new 0.5 mm thick Cordierite filter disc. The porosity of the metal disc was 70%, the pore size of the metal disc was 25–35 µm, while the porosity of the Cordierite filter disc was 35% and the pore size was 25–35 µm. From the comparison test it is concluded that at any flow rate of exhaust or flue gas, the counterpressure produced by the porous filter body of the flue gas filter means according to the present invention is lower than the counterpressure produced by the known 0.5 mm Cordierite filter disc. It is to be realized that the counterpressure generated by the filter body is of the utmost importance when the filter means is employed in a diesel engine.

In FIG. 5, a third embodiment of a porous filter body according to the present invention is shown, which embodiment is designated the reference numeral 70 in its entirety. The porous filter body 70 is basically of a honeycomb structure manufactured in an extrusion process to be described in greater detail below with reference to Example 2. The porous filter body 70 has an outer wall 86 defining a circular, cylindrical outer wall. In its longitudinal direction, a plurality of through-going channels extend from one end shown in FIG. 5 to the opposite end of the circular, cylindrical body 70, one of which channels is designated the reference numeral 72. The channel 72 is open at its end shown in FIG. 5 and blocked by a plate segment at the opposite end, not shown in FIG. 5. The channels adjacent to the channel 72 are, contrary to the channel 72, blocked by plate segments 74 at their ends shown in FIG. 5. However, these adjacent channels are open at their opposite ends, not shown in FIG. 5. A porous partition wall extending longitudinally within the porous filter body 70 is designated the reference numeral 76. The plate segments 74 may be porous or non-porous plate segments.

In FIG. 6, a segment of the honeycomb porous filter body structure 70 shown in FIG. 5 is shown in an enlarged scale. Thus, in FIG. 6, the channel 72 is shown defined by opposite partition walls 76 and 78 and blocked at its lower end by the filter plate segment 74. From FIG. 6, it is further evident that the channels adjacent to the channel 72 are blocked at their upper ends by filter plate segments 74. In FIG. 6, the upper ends of the vertical channels constitutes a flue gas entry end, through which particle-containing flue gas is introduced as indicated by an arrow 80. The arrow 80 illustrates the direction along which the flue gas is conducted or guided into the porous filter body. The particles introduced into the porous filter body are illustrated by dots, one of which is designated the reference numeral 82. The particles are trapped by the partition walls 76 and 78 and further the filter plate segments 74 as the flue gas stream is forced through partition walls 76 and 78 of the porous filter body as indicated by arrows, one of which is designated the reference numeral 84. After having been forced through the partition walls 76 and 78, the flue gas does not to any substantial extent contain particles or soot.

In FIG. 7, a fourth embodiment of a porous filter body contained in a flue gas filter means designated the reference numeral 90 is shown. The flue gas filter means 90 comprises an outer encasing or housing, which is partially cut away and which ends in a tubular component 92 for connection to an exhaust tubing or tube. Within the encasing, a plurality of hollow tubular porous filter elements constituting a fourth embodiment of the porous filter body according to the present invention is enclosed, one of which elements is designated the reference numeral 94. Each element 94 is at its upper end, shown in FIG. 7, blocked by a circular plate 96. The plates 96 are supported by a grid structure 100. A wall section 98 of the element 94 is shown in an enlarged scale at 99 disclosing the porous structure of the element. The ends of the tubular porous filter elements opposite to the ends shown in FIG. 7 are unblocked and constitute inlets or outlets through which flue gas is passed. As the upper ends shown in FIG. 7 are blocked, the flue gas is forced, during operation, through the porous tubular walls of the hollow tubular porous filter elements. A ceramic fibre coil trap of a structure similar to that of the flue gas filter means 90 shown in FIG. 7 is disclosed in SAE (Society of Automobile Engineers), paper No. 870011, entitled "Urban Bus Application of a Ceramic Fiber Coil Particulate Trap", by H. O. Hardenberg, Daimler-Benz AG, Stuttgart, Germany, to which reference is made.

In FIG. 8, a vehicle designated the reference numeral 120 in its entirety is shown. The vehicle 120 comprises a frame 122 on which front and rear wheels 124 and 126, respectively, are supported. A driver's cab 128 is further supported on the frame 122, which also supports a diesel engine 130, from which an exhaust tube 132 extends and is connected to a combustion gas or flue gas filter means 134 according to the present invention. The combustion gas filtering means 134 may be implemented in accordance with any of the principles described above, however, preferably as a honeycomb porous filter body structure of the type shown in FIGS. 5 and 6.

EXAMPLE 2

Porous metal filter bodies according to the present invention and of the honeycomb structure shown in FIG. 5 were produced at Stobbe Engineering A/S' laboratory in Gentofte, Denmark, and at the Institute of Mineral Industry, Technical University of Denmark, Lyngby. The production process was basically an extrusion process in which a barrel and a screw ere employed. From a metal powder of the type AISI 316 L supplied by the company Höganäs, an extrusion paste was produced further comprising a "green" or volatile binder of the type methyl cellulose, supplied by the company Hoechst and sold under the trade name Tylose MH 300 P. The plasticity and the viscosity of the paste was controlled by water and alcohol. In various experiments, the binder contained in the paste constituted 5–10 percent by weight and the content of water and alcohol constituted 25–40 percent by weight. Various ratios between water and alcohol of the order of 1:1.5 to 1:0.3 were tested. It was discovered that the provision of water and alcohol together provided a far more plastically deformable paste as compared to a paste including water only. The provision of alcohol did not influence the handling strength of the "green" bodies produced in the extrusion process. It is believed that a chemical reaction takes place when alcohols are added to the paste as a viscosity and plasticity controlling agent.

The extrusion was carried out at a temperature of approximately 18° C. and was performed on a machine having a 80 mm screw extending through a die apparatus comprising an extrusion die with an inlet and an outlet surface. By the extrusion process, honeycomb structures having 25–100 cells/in$^2$ were produced. The extrusion operation pressure was of the order of 8–15 bar, and the particle size of the metal powder was of the order of 45–150 μm. By the extrusion process, "green" bodies were produced, which were dried in an oven of a constant humidity of 40–80% relative humidity and a temperature of 30°–65° C. for at least 2–4 days. The dried "green" bodies had a high handling strength allowing both machining and arrangement in a sintering oven. A sintering of the "green" bodies was carried out in an oven in which an $H_2$ atmosphere was produced in a gas-tight metal or ceramic chamber, in which a temperature of 1200°–1300° C. was generated.

After drying and sintering, the bodies had shrunk 2–10%. The porous filter bodies thus produced had a high porosity, of 60–70%, and a pore size of 30–50 μm. The density of the material was about 2.7 g/cm$^3$ and the total bulk density was about 1.3–1.4 g/cm$^3$. The thermal conductivity of the porous metal filter bodies was measured and it was established that the thermal conductivity was at least 5–10 times that of the material Cordierite, which has a thermal conductivity less than 1 W/mK, and which is a ceramic material used in known flue gas filters.

It was found that the temperature at which the extrusion process was carried out was of minor importance to the handling strength of the "green" bodies. It was further established that the particle size in conjunction with extrusion pressure, content of viscosity and plasticity controlling agents (water and alcohol) and binder were decisive for the porosity of the product.

The honeycomb porous filter bodies thus produced had far larger tensile strength and were fare more elastic than similar structures manufactured from Cordierite, and they further allowed a far simpler canning without the provision of a lining between the filter body and the can. In known flue gas filters, a lining is provided between the ceramic body or bodies and the can, since the coefficients of thermal expansion of the ceramic material and the canning material are different.

Investigations have disclosed that even a 10% larger filtering surface can be provided by employing porous metal filter bodies in a metal can as compared to a similar structure of identical outer can dimensions, however, including a conventional Cordierite or ceramic filter structure.

It is believed that porous metal filter bodies of various shapes and structures may be produced by employing a cold compacting process with a transient pore forming agent (polypropylene or polystyrene), lost wax casting, injection molding, River's injection molding process and linear pressing. The following binders and plastisizers are further believed to be of interest for controlling the handling strength and mechanical properties of the paste form which the porous metal filter bodies are produced: glycerin, waxes such as waxes supplied by the company Hoechst, ethyl silicates supplied by Wacker, sodium silicates supplied by Diamond Shamrock and polyvinyl alcohols supplied by Kuraray Puval. The following particulate metal powder materials are of interest: AISI 316 L supplied by Höganäs and Avesta MA 253.

Apart from the above described $H_2$ atmosphere containing high temperature (1200°–1300° C.) oven, it is believed that a vacuum furnace in which a temperature of 1400° C. is generated, may be used for sintering the "green" bodies to the porous metal filter bodies.

It is to be mentioned that porous metal filter bodies have been produced from some of the combinations of the above mentioned materials.

EXAMPLE 3

Porous filter bodies of various shapes and manufactured from the metal-like material SiC were produced at Stobbe Engineering A/S' laboratory in Gentofte, Denmark, and at the Institute of Mineral Industry, Technical University of Denmark. The porous SiC filter bodies were produced by employing extrusion and injection molding techniques by which injection and extrusion pressures of the order of 5–15 bar were generated.

The porous SiC filter bodies were manufactured from SiC grains of a size of 75–170 μm. A "green" or volatile binder and a permanent or ceramic binder were used. The following permanent or ceramic binders were used: glass-mullite and silicon nitride. The following volatile or "green" binders were used: methylcellulose, clay and carbon black in a total amount of 5–15 percent by weight. The following plasticity and viscosity controlling agents were used in an amount of up to 0.2 percent by weight: glycerol and alcohol. Water and alcohol were further used as solvents in an amount of 20–25 percent by weight.

From the above components together constituting a paste, "green" bodies were produced, which "green" bodies were dried. The "green" bodies were then heated to a temperature of 1500°–1900° C. for generating the permanent or ceramic binder and consequently sintering the bodies together. From the clay binder, glass-mullite was generated provided the sintering process was carried out in the atmosphere, and silicon nitride was generated as the permanent or ceramic binder from the clay binder provided the sintering process was carried out in an $N_2$ atmosphere. By sintering the "green" bodies in an $N_2$ atmosphere, which "green" bodies included clay as the volatile or "green" binder, $Al_2O_3$ was further generated as a permanent binder.

The porous SiC filter bodies thus produced were tested and had the following characteristics: the porosity was of the order of 30–60%, the bulk density was of the order of 1.0–1.7 g/cm³ resulting in a geometrical bulk density of the filter bodies of the order of 0.5–0.8 g/cm³. It was discovered that the pore size of the porous SiC filter bodies could be matched to certain requirements determined by the initial size of the SiC grains.

It is believed that the following components may be used in connection with porous SiC filter bodies:

permanent binder: micro-crystalline-siliconcarbide instead of glass-mullite or silicon nitride, green or volatile binder: waxes, ethyl silicates, polycarbosilane instead of or in addition to methyl cellulose, clays and carbon black.

It is further believed that the sintering process may be carried out in atmospheres different from the atmosphere and $N_2$ atmosphere, e.g. in an atmosphere of argon or helium.

The SiC porous filter body has a high resistance to corrosion and high thermal conductivity (100 W/mK). The resistance to corrosion is of particular importance in connection with the filtering of exhaust gases from diesel engines, which exhaust gases are known to be highly corrosive. The porous SiC filter body according to the present invention further has a high melting point, which ensures that the porous filter body under no circumstances is melted down.

Apart from its ability to stand the thermal stresses generated by the burning-off of particles trapped in the porous filter body, the porous filter body concept of the present invention provides distinct advantages as compared to the prior art ceramic filter flue gas structures. The flue gas filter means according to the present invention provides an almost optimum space and surface relationship, which is of the outmost importance in connection with automobiles, vehicles, locomotives, etc., where the flue gas filter means must be of a maximum compactness for occupying minimum space and still provide an adequately large filtering surface area.

A further important aspect of the present invention relates to the provision of porous metal filter bodies, which are easily canned, e.g. by a low alloy stainless steel can or enclosure, which is simply welded or brazed to the metal porous filter body. As discussed above, the porous filter body of the present invention may be provided with a catalyst for catalysing the burning-off of soot accumulated in the porous filter body, however, the catalyst may alternatively be provided in the can or enclosure, e.g. as an inner coating thereof.

It is further believed that the teachings of the present invention may find application in other technical fields, in which gases or liquids are to be filtered, by which filtering process particles are accumulated in the filter means, whereupon the particles are burned off, by which burning-off the filter body is exposed to high temperatures, which should be controlled or reduced or even eliminated so as to eliminate risk of any fatal damaging of the filter body.

I claim:

1. A method for preparing a porous filter body comprising:
    mixing together SiC particles having a size of 75–170 μm, a green or volatile binder, a plasticity or viscosity controlling a gent and a solvent to form a plastic paste;
    extruding the plastic paste to form an extruded body; and
    sintering the extruded body so as to bind the SiC particles together to produce a filter body having a maximum pore size of 10–100 μm, a thermal conductivity of at least 5 W/mK and a porosity of 30–60%.

2. The method of claim 1, wherein the thermal conductivity of the filter body is at least 10 W/mK.

3. The method of claim 1, further comprising mixing microcrystalline SiC together with the SiC particles having a size of 75–170 μm, the green or volatile binder, the plasticity or viscosity controlling agent and the solvent to form the plastic paste, wherein the micro crystalline SiC forms a permanent binder in the sintered body.

4. The method of claim 1, wherein the filter body is provided with a carbon oxidation catalyst constituting a coating of said filter body.

5. The method of claim 1, wherein the filter body is provided with a carbon oxidation catalyst comprising an alloy or a composition including the SiC of the filter body.

6. A means for filtering particles from a flue gas, comprising a porous filter body of particulate SiC with a particle size in the range of 75–170 μm bonded together in said porous filter body, said porous filter body having a porosity of 30–90%, a maximum pore size of 10–100 μm, and a thermal conductivity in excess of 5 W/mK.

7. A means for filtering particles from a flue gas comprising a porous filter body prepared form a particulate material having a thermal conductivity in excess of 10 W/mK and a particle size in the range of 45–170 μm, bonded together in said porous filter body in a sintering process, said porous filter body having a porosity of 30–90% and a maximum pore size of 10– 100 μm, and said porous filter body having a thermal conductivity in excess of 5 W/mK.

8. The means for filtering particles from a flue gas according to claim 7, wherein the particulate material is selected from the group consisting of metal and metal-like materials.

9. The means for filtering particles from a flue gas according to claim 8, wherein the particulate material is a metal-like material.

10. The means for filtering particles from a flue gas according to claim 9, wherein the metal-like material is SiC.

11. The means for filtering particles form a flue gas according to claim 7 wherein said porous filter body has a flue gas inlet side surface and an opposite gas outlet side surface, a first plurality of blind filtration cavities extending perpendicularly into said body from said inlet side surface and a second plurality of blind filtration cavities extending perpendicularly into said body from said outlet side surface, said blind filtration cavities of said first and second pluralities being arranged spaced apart and mutually juxtaposed.

12. The means for filtering particles from a flue gas according to claim 11, wherein said porous filter body has partition walls defining a honeycomb structure.

13. The means for filtering particles from a flue gas according to claim 7, further comprising a carbon oxidation catalyst.

14. The means for filtering particles from a flue gas according to claim 13, wherein the carbon oxidation catalyst constitutes a coating of said porous filter body.

15. The means for filtering particles from a flue gas according to claim 7, wherein the porous filter body has a porosity of 40–75%.

16. The means for filtering particles from a flue gas according to claim 7, wherein the porous filter body has a maximum pore size of 25–75 μm.

17. The means for filtering particles from a flue gas according to claim 7, wherein the porous filter body has a thermal conductivity of 5–100 W/mK.

18. A vehicle comprising a diesel engine generating flue gas, which is exhausted from said diesel engine through a flue gas filter means comprising a porous filter body prepared from a particulate material having a thermal conductivity in excess of 10 W/mK and a particle size in the range of 45–170 μm, bonded together in said porous filter body in a sintering process, said porous filter body having a porosity of 30–90% and a maximum pore size of 10–100 μm, and said porous filter body having a thermal conductivity in excess of 5 W/mK.

19. A method for preparing a porous filter body comprising:

mixing together particles of a particulate material having a thermal conductivity in excess of 10 W/mK and having a size of 45–170 μm, a green or volatile binder, a plasticity or viscosity controlling agent and a solvent to form a plastic paste;

extruding the plastic paste to form an extruded body; and sintering the extruded body so as to bind the particles together and to produce a filter body having a maximum pore size of 10–100 μm, a thermal conductivity of at least 5 W/mK and a porosity of 30–60%.

* * * * *

UNITED STATES PATENT AND TRADEMARK OFFICE
CERTIFICATE OF CORRECTION

PATENT NO. : 5,497,620

DATED : March 12, 1996

INVENTOR(S) : Stobbe

It is certified that error appears in the above-identified patent and that said Letters Patent is hereby corrected as shown below:

On title page, in [63], "PCT/DE89/00083" should be --PCT/DK89/00083--.

On title page, in [30], "1938/88" should be --1939/88--.

In column 1, line 5, insert --issued on March 23, 1993-- after "5,195,319".

In column 6, line 12, "form" should be --from--.

In column 7, line 41, "particular" should be --particles--.

In column 14, line 46, "fare" should be --far--; line 66, "form" should be --from--.

In column 16, line 46, claim 1, "a gent" should be --agent--.

In column 17, line 6, claim 7, "form" should be --from--; line 22, claim 11, "form" should be --from--.

Signed and Sealed this

Thirty-first Day of December, 1996

Attest:

BRUCE LEHMAN

Attesting Officer     Commissioner of Patents and Trademarks